United States Patent [19]
Russo

[11] Patent Number: 4,716,747
[45] Date of Patent: Jan. 5, 1988

[54] TOP LOCKING PLUG VALVE

[75] Inventor: Onofrio N. Russo, Middle Village, N.Y.

[73] Assignee: Gas Energy, Inc., Brooklyn, N.Y.

[21] Appl. No.: 888,718

[22] Filed: Jul. 24, 1986

[51] Int. Cl.4 .............................................. B60R 25/02
[52] U.S. Cl. .......................................... 70/179; 70/185
[58] Field of Search ............... 70/175, 176, 177, 178, 70/182, 183, 184, 185, 187, 232; 137/383, 385

[56] References Cited

U.S. PATENT DOCUMENTS

| 576,956 | 2/1897 | Doyle | 137/305 |
|---|---|---|---|
| 753,349 | 3/1904 | Bacon | 70/187 |
| 1,026,725 | 5/1912 | Ulmer | 137/385 |
| 1,541,216 | 5/1924 | Hendricks . | |
| 1,903,190 | 3/1933 | Neldner | 70/175 |
| 1,970,463 | 1/1934 | Mann | 70/124 |
| 2,059,085 | 2/1936 | Buck | 137/13 |
| 2,092,572 | 9/1937 | Deane | 70/175 |
| 3,782,146 | 1/1974 | Franke | 70/232 |
| 4,024,740 | 5/1977 | Di Giovanni | 70/175 |
| 4,217,925 | 8/1980 | Clark | 137/385 |
| 4,362,035 | 12/1982 | Vitale | 70/222 |
| 4,402,339 | 9/1983 | Owens | 70/176 |
| 4,458,510 | 7/1984 | Nielsen | 70/212 |
| 4,465,092 | 8/1984 | Vitale | 137/328 |
| 4,483,366 | 11/1984 | Labita | 137/385 |

Primary Examiner—Robert L. Wolfe
Attorney, Agent, or Firm—Fitzpatrick, Cella, Harper & Scinto

[57] ABSTRACT

A rotary plug valve has a body providing a seat for a rotatable valve member which has an operator surrounded by a portion of the body and which may be rendered inaccessable by a cover closing the surrounding portion of the body and lockable to the valve member.

13 Claims, 8 Drawing Figures

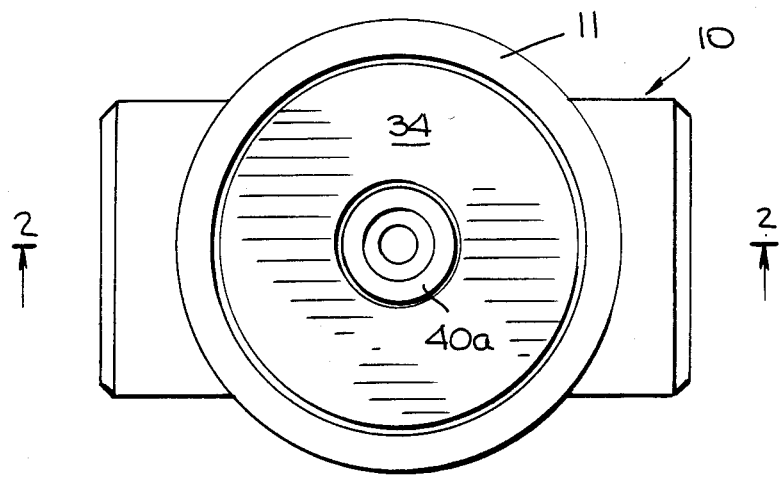
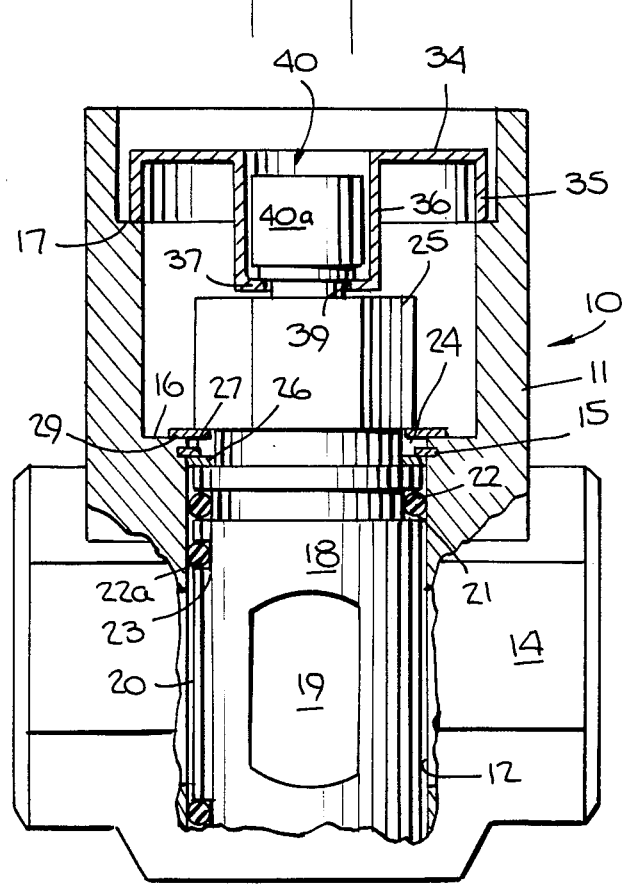
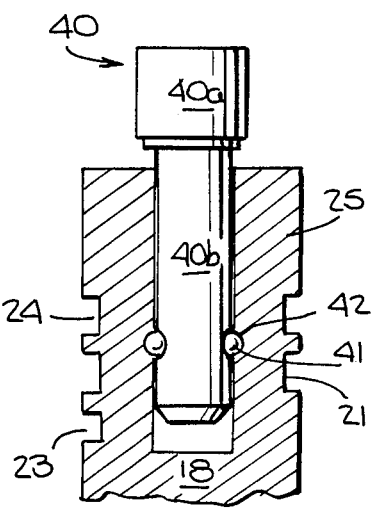

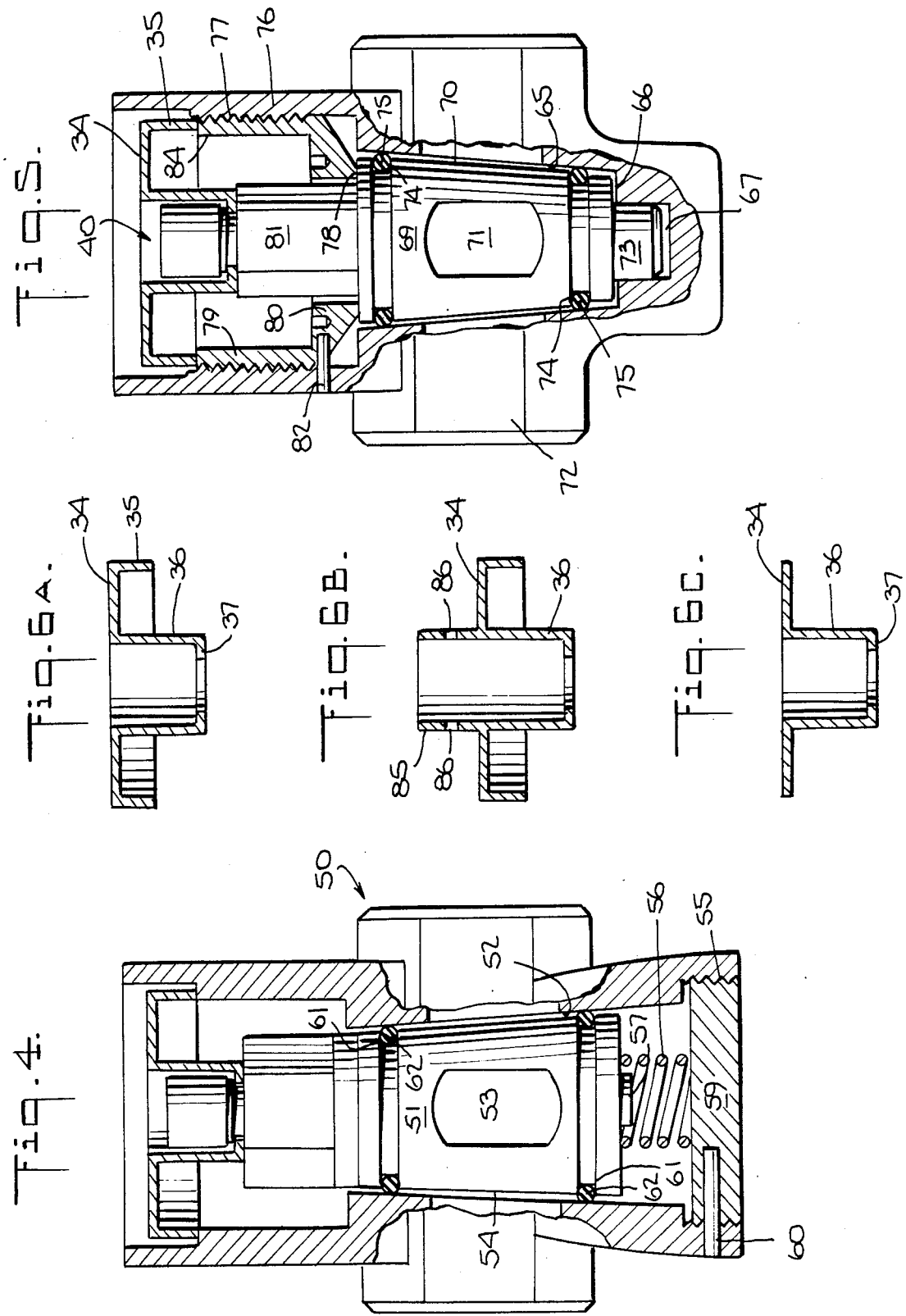

TOP LOCKING PLUG VALVE

BACKGROUND OF THE INVENTION

1. Field of the Invention

This invention relates to a plug valve and, more particularly, to a top locking rotary plug valve, especially one with a closed bottom, which may be locked in a predetermined position. Valves of the class here contemplated find application in gas service lines, for example, to enable gas service to be shut off by locking the valve in its closed position. By the expression "top locking plug valve" I mean a plug valve lockable by the application of a security mechanism to the end of the plug at the open end of the valve body.

2. Description of the Prior Art

It is known from U.S. Pat. No. 2,092,572 directed to a concealed valve and lock plug, to provide a base 32 threaded into the upper extremity of an upstanding portion 19 of a plug casing and centrally recessed to provide a non-circular socket 71 that receives a pin 72 having a central cylindrical bore 73 adapted to receive an expanding tool or key of the type shown in FIG. 9. A cap 69 having a central bore 74 aligned with the bore 73 also has a non-circular socket 75 adapted also to receive the end of the pin 72. However, the pin is of a length to fit entirely within the lower socket 71 in the base 72.

The cap 69 has an interior groove 70 and the base 32 has an external groove 67 in register therewith so that both grooves may receive a washer that permits the cap to rotate freely relative to the base 32. A bore 74 in the cap 69 registers with the bore 73 so that when the key is inserted through the bore 74 into the recess 73, the non-circular sockets may be aligned and the pin 72 drawn upward so that it extends into both sockets 75 and 71 whereupon, a tool applied to the cap 69 to rotate the same will also rotate the base 32 thus permitting it to be removed from the casing of the valve, following which a suitable tool may be applied to the "operator" atop the valve plug in order to rotate the same.

A suitable tool is illustrated in FIG. 4 and includes a bushing 25 threadably receiveable into the upstanding portion of the casing and being centrally bored to receive the shank 21 of the tool, a spring 24 acting against the bushing and a sleeve 22 pinned to the shank so that when the tool is in use, the spring force is transmitted to the top of the plug in order to assure that it is held securely in the tapered bore thus to prevent fluid leakage while the plug is being operated.

U.S. Pat. No. 753,349 illustrates a lockable faucet utilizing a conventional lock cylinder operated by the placement of tumblers by a bitted key 16, the lock plug 3 being provided with a recess 9 engageable by a projection 10 integral with a lock-shell 11 which is rotatable by handle 26 in the cylindrical barrel 12 when the lock bolt 15 (FIG. 2) is retracted from the bolt-slot 14 (FIG. 4) by operation of the key.

U.S. Pat. No. 1,970,463 discloses a valve lock having a casing and plug, the upper end of the plug being recessed to receive a spring 17. The lock case 16 is preferably angular in cross section so that its sides may be engaged by a wrench for turning the same. The device includes a locking pin 19 which may project into annular channel 20 in the inner surface of the valve casing near its upper end or in an aperture 21 below the channel 20. When the valve case is depressed against the force of the spring 17, the pin may be projected into the aperture 15 to lock the device against rotation. That is, when the key is manipulated to retract the pin from the position shown in FIG. 3, the lock case may be pressed inwardly until it is seated in the valve plug in which position the pin is in alignment with the aperture 15. By rotating the key, the pin 19 is withdrawn from the aperture 15, the spring 17 projects the lock case upwardly and the pin may again be projected into the aperture 14 of the plug extension and into the annular channel 20 so that the plug may be rotated by application of the tool to the exterior side of the projecting lock case.

In U.S. Pat. No. 4,362,035, there is disclosed a lockable closure wherein, in order to permit disengagement of a threaded element from a conduit, a cam 72 is actuated by a key to permit movement of the lock elements 70 to their respective retracted position so that the lock pin 58 may slide axially outwardly from the bore 26. The shield 36 may thus be removed from the threaded element 20 in order to expose the flats 32 of the boss 30. A wrench may then be engaged with the flats and threaded element 20 may be unscrewed from the conduit 100.

In the second embodiment, as seen in FIG. 11, hexagonal section 151 is received in a mating socket formed in cap element 146. The shield 144 is provided with a cylindrical recess 152, as shown in FIG. 10, coaxially surrounding the stem 150 over a portion of its length and a radially inwardly facing annular groove 153 in the circumferencial wall of the recess. The face 154, transverse to the axis of the stem 150 is provided on flange 148, recess 152 being open to the face 154. Crown surface 180 of lobe 176 confronts a lug 196 and surface 182 of lobe 178 confronts the other lug 196 when the cam 168 is in its engaged position. Upon rotation of the shield 144, and hence of the stem 150, each lug 196 will encounter one of the ramp surfaces 140 or 142 of the groove in which it is engaged and each lug will thus be urged radially inwardly. However, the lugs will bear on one of the crown surfaces of the cam and will therefore be retained in engagement in one of the grooves 138, and also in one of the openings 164 of the stem, the lugs will connect the stem and hence the entire shield to the threaded element for rotation therewith in either direction. Accordingly, the threaded element 120 can be unscrewed from the conduit 100 or tightened on the same.

Other disclosures of interest will be found in U.S. Pat. Nos. 1,541,216, 2,059,085, 4,024,740, 4,458,510, 4,465,092 and 4,483,366.

SUMMARY OF THE INVENTION

The prior constructions known to me reveal a need for a simple, inexpensive top locking plug valve that utilizes a minimum number of parts but is highly effective in securing the valve against tampering when locked in a desired position.

Accordingly, I have conceived and contribute by the present invention a top locking plug valve by which I am able to achieve the aforementioned desirable characteristics.

For attaining the objectives mentioned and later to be expressed, an important aspect of my invention resides in the provision of a top locking plug valve that includes a body formed with an upstanding skirt and having a seat and a flow passageway therethrough intercepted by said seat and a valve member or plug having a flow passage therethrough and being rotatable relative to the seat formed in the body between a selected open position in which its flow passage registers with the flow passageway in the body and a selected closed position in which its flow passage does not register with the flow passageway in the body. The valve member here contemplated has an operator extending into the skirt formed in the body so that rotation of the operator effects rotation of the valve member relative to the seat, and means lockable across the skirt to prevent access to the operator.

I also provide means associated with the body and the valve member to prevent axial displacement of one relative to the other and such means may take the form of means defining a shoulder in the valve member and a shoulder in the body with a device such as a ring engaging the shoulders and such means may further include resilient means such as a spring urging the valve member in a direction to maintain it well positioned relative to the seat formed in the body, the seat and valve member having tapered surfaces for mutual engagement.

In another form, the ring means is secured in the skirt so as to bear against the valve member and to provide a shoulder in the skirt against which the means lockable across the skirt may bear.

The means lockable across the skirt includes a cover, preferably of drill proof material, and I provide means for securing the cover against removal therefrom.

The securing means can include an elongated locking pin having an enlarged head and a reduced shank, the shank being adapted to be locked to the operator. The cover is formed with an aperture large enough to permit passage of the shank but not the head of the locking pin therethrough so that when the cover engages the shoulder and the shank extends through the aperture and is locked to the operature, the operator is inaccessible.

The shoulder may be recessed in the skirt and the cover may be formed with a depending peripheral flange adapted to seat on the shoulder. In this way, the major surface of the cover, which may be a flat surface, can be disposed flush with the distal end of the skirt, and the cover flange protects against insertion of a tool under the cover.

The cover may also be formed with an internal depending tubular section, that is, one that depends from the major surface of the cover, inwardly of its periphery and flanged inwardly at its distal end to define the opening in the cover. The locking pin head may be received in the tubular section so that its outer end is flush with the distal end of the skirt and the flat surface of the cover and its inner end overlies the inturned flange to maintain the cover in place.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

DESCRIPTION OF THE DRAWINGS

Specific embodiments of the invention have been chosen for purposes of illustration and description, and are shown in the accompanying drawings, forming a part of the specification wherein:

FIG. 1 is a top plan view of a valve according to the present invention;

FIG. 2 is a cross-sectional view taken along the line 2—2 of FIG. 1 illustrating an embodiment of the valve of the present invention;

FIG. 3 is a fragmentary view, partly in section, illustrating the locking pin in locking position relative to the operator of FIG. 2;

FIG. 4 is a view similar to FIG. 2, but illustrating a second embodiment of the present invention;

FIG. 5 is a view similar to FIGS. 2 and 4, but illustrating a third embodiment of my invention; and FIGS. 6A, 6B and 6C are cross-sectional views which illustrate respective forms of the cover here described.

PREFERRED EMBODIMENTS OF THE INVENTION

Referring now to FIGS. 1 and 2 of the drawing, there is shown a valve of the class described having a body 10 formed with a closed bottom, and an upstanding skirt 11, as viewed, means such as a bore whose surface defines a cylindrical seat 12 and a flow passageway 14 intercepted by the seat. The surface defining the seat 12 has an annular recess 15 near the upper end, as viewed, and the interior surface of the skirt 11 is formed with upwardly facing shoulders 16 and 17 all for a purpose later to be described.

There is also shown a valve member 18 in closed position and formed with a passage 19 therethrough and a cylindrical surface 20 adapted closely to interface or mate with the seat 12 of the body 10.

The valve member or plug 18 has an annular groove 21 in its exterior surface above the passage 16 for receipt of and O-ring 22 sealing against leakage. The valve member is also recessed at 24 above the groove 21 and enlarged above the recess to provide an operator 25 of noncircular configuration in plan. The valve member 18 also has a recess 23 in a vertical plane, as viewed, for receipt of an O-ring 22a that surrounds the inlet side of the valve body passageway 14 and seals against the seat 12 when the valve is closed to prevent gas leakage from the pressurized inlet.

As further shown in FIG. 2, the lower surface of the recess 24 supports a washer 26, the upper surface of which bears against a snap-ring 27, whose outer periphery extends into the recess 15 in the body 10, and a second washer 29 sits on the shoulder 16 and is engaged at its upper surface by the bottom of the operator 25. This arrangement assures maintenance of the positional relationship of the body 10 and valve member 18.

From the description thus far, it will be seen that the operator may be engaged by a suitable tool extending downwardly into the skirt 11 and rotated about its vertical axis in turn to rotate the entire valve member 18 relative to the body 10. In this way, the flow passage 19 of the valve member may be positioned relative to the seat 12 in the valve body in a selected open position in which the flow passage 19 registers with the flow passageway 14 in the valve body and, as shown in FIG. 2, in a selected closed position in which the flow passage 19 does not register with the passageway 14.

In order to prevent unauthorized access to the operator 25, I provide a cover 34 of case hardened steel which extends across the upper or distal end of the skirt 11. In the embodiment of FIGS. 1 and 2, the cover 34 rests on the shoulder 17 in the skirt 11. Actually, the cover is formed with a depending peripheral flange 35, the end of which seats on the shoulder 17. The cover 34 also has an internal depending tubular section 36 which is flanged inwardly as at 37 at its lower end, as viewed, to define a central aperture 39 in the cover.

A locking pin 40, which per se does not constitute a part of this invention, and which is shown in FIG. 3, has an enlarged head 40a and a reduced shank 40b, the shank being adapted to lock to the operator 25 by cooperation of balls 41 retractably extending from openings in the shank into an annular groove 42 in a bore 44 formed centrally of the operator 25.

It will be noted that the aperture 39 in the cover is large enough to permit passage of the shank 40b but not the head 40a of the locking pin 40 therethrough so that when the cover 34 engages the shoulder 17 and the shank 40b extends through the aperture 39 and is locked to the operator 25, the operator is inaccessible so that the valve member 18 may not be rotated relative to the body 10.

The locking pin may be unlocked in a known way by the insertion of a special key actuator into the pin through an opening in the exposed surface of its head and the locking pin may then be withdrawn from the operator 25. The cover 34 may then be removed to expose the operator 25 for rotation by a tool formed to engage its non-circular surface.

Turning now to FIG. 4, the valve there depicted has a body 50 and valve member 51 similar to those of FIGS. 1 and 2 except that in this case, the valve seat 52 and exterior surface 54 of the valve member are diminishing in diameter in the upward direction, as viewed.

It will be appreciated that, because of this construction, the valve member must be inserted from the bottom of the valve body. To this end, the valve body 50 is formed with a threaded opening 55 at its lower end through which the valve member 51 is inserted along with a resilient member such as a helical spring 56 one end of which surrounds a centering projection 57 depending axially of the valve member. The spring urges the valve member upwardly for good seating by bearing against the bottom of the valve member and the top of a threaded plug 59 closing the opening 55 and secured in position by a blind pin 60.

The valve member 51 is formed with annular recesses 61 in its outer surface 54, one above and one below its flow passage 53, each for the reception of an O-ring 62 for sealing the interface between the surface 54 and the seat 52.

The structural and functional characteristics of the skirt 11, cover 34, operator 25 and locking pin 40 of FIG. 4 are the same as those described in connection with FIGS. 1 to 3. However, in the present embodiment, the washers 26 and 29 and the groove 15 and snap ring 27 may be dispensed with.

In the embodiment of FIG. 5, the valve body is formed with a closed lower end as in the embodiment of FIG. 2 but the seat 65 is conical with its diameter diminishing in the downward direction and terminating in an annular shoulder 66 which in turn merges with a depending cylindrical wall forming a blind recess 67.

The valve member or plug 69 has a conical surface 70 adapted closely to interface or mate with the seat 65 and is formed with a passage 71 shown in the closed position relative to the passageway 72 in the body. Annular recesses 74 are provided in the valve body, one above and one below the passage 71, each for the reception of a sealing O-ring 75. The lower end of the valve member 69 has an axially depending projection 73 extending from the bottom of the valve member into the recess 67 and the upper end has an annular radial shoulder 78 extending outwardly of the base of the upwardly projecting operator 81.

In the present embodiment, the upstanding skirt 76 integral with the body is internally threaded as at 77 for engagement with an externally threaded ring 79 shorter than the skirt and having an annular inwardly extending flange 80 at its lower end, the lower surface of which flange abuts the upper annular shoulder 78 of the valve member to retain the bottom of the valve member against the shoulder 66. The ring 79 may be fixed in position by a blind pin 82.

As mentioned, the ring 79 is shorter than the skirt 76 wherefore it provides a shoulder 84 against which the flange 35 of the cover 34 may abut when the cover is locked in place across the skirt opening by the locking pin 40, as shown and as heretofore explained in connection with the description of FIG. 2.

FIGS. 6A, 6B and 6C illustrate various forms of cover 34, FIG. 6A illustrating the cover having flanges 35, 36 and 37 and having already been described.

FIG. 6B shows a cover 34 similar to that of FIG. 6A but having an upstanding tubular section 85 which may be an extension of the tubular flange 36. The section 85 is provided with diametrically opposed slots 86 for receipt of a sealing wire which if ruptured, will indicate tampering.

FIG. 6C shows a further form of cover 34 having only flanges 36 and 37. This form of cover extends across the top and rests on the end surface of the skirt of the valve body.

I believe that the construction and operation of my novel top locking plug valve will now be understood and that the advantages thereof will be fully appreciated by those persons skilled in the art.

I claim:

1. A rotary plug valve comprising:
   a body formed with an upstanding skirt and having a seat and a flow passageway therethrough intercepted by said seat;
   a valve member having a flow passage therethrough and being rotatable relative to said seat formed in said body between a selected open position in which its flow passage registers with the flow passageway in said body and a selected closed position in which its flow passage does not register with the flow passageway in said body;
   said valve member having an operator extending into said skirt formed in said body, rotation of said operator effecting rotation of said valve member relative to said seat;
   removable means lockable extending across the area defined by said skirt to prevent access to said operator; and
   means associated with said body and said valve member to prevent axial displacement of said valve member relative to said body.

2. A valve according to claim 1, wherein said means for preventing axial displacement include means defining a shoulder in said valve member and a shoulder in said body and a ring bearing against both shoulders.

3. A valve according to claim 1, wherein said means for preventing axial displacement of said valve member relative to said body include resilient means.

4. A valve according to claim 3, wherein said seat and said valve member have tapered surfaces and said resilient means comprise a spring urging said tapered surfaces into engagement.

5. A valve according to claim 1, wherein said means for preventing axial displacement of said valve member relative to said body include ring means secured in said skirt and bearing against said valve member.

6. A valve according to claim 5, wherein said ring means provides a shoulder in said skirt and said means lockable across said skirt bears against said shoulder.

7. A valve according to claim 1, wherein said skirt is provided with means defining a shoulder and said means lockable across said skirt includes a cover engageable with said shoulder and means for securing said cover against removal therefrom.

8. A rotary plug valve comprising:
a body formed with an upstanding skirt and having a seat and a flow passageway therethrough intercepted by said seat, said skirt including means defining a shoulder;
a valve member having a flow passage therethrough and being rotatable relative to said seat formed in said body between a selected open position in which its flow passage registers with the flow passageway in said body and a selected closed position in which its flow passage does not register with the flow passageway in said body;
said valve member having an operator extending into said skirt formed in said body, rotation of said operator effecting rotation of said valve member relative to said seat;
a cover engagable against said shoulder of said skirt; and
means for securing said cover against removal from said shoulder including an elongated locking pin having an enlarged head and a reduced shank, said shank being adapted to be locked to said operator, said cover being formed with means defining an aperture large enough to permit passage of said shank therethrough but small enough to prevent passage of said head therethrough whereby, when said cover engages said shoulder and said shank extends through said aperture and is locked to said operator, said operator is inaccessible.

9. A valve according to claim 8, wherein said shoulder is recessed in said skirt and said cover has a depending flange adapted to seat on said shoulder.

10. A valve according to claim 8, wherein said cover is formed with an internal, depending tubular section flanged inwardly at its distal end to define said opening in said cover.

11. A valve according to claim 10, wherein said shoulder is recessed in said skirt and said cover has a depending flange adapted to seat on said shoulder.

12. A valve according to claim 7, wherein said shoulder is recessed in said skirt and said cover has a depending flange adapted to seat on said shoulder.

13. A rotary plug valve comprising:
a body formed with an upstanding skirt and having a seat and a flow passageway therethrough intercepted by said seat;
a valve member having a flow passage therethrough and being rotatable relative to said seat formed in said body between a selected open position in which its flow passage registers with the flow passageway in said body and a selected closed position in which its flow passage does not register with the flow passageway in said body;
said valve member having an operator extending into said skirt formed in said body and being formed with an axial bore in its end remote from said valve member and means defining at least one lateral depression in said bore, said bore thus being adapted removably to receive a locking pin and said at least one lateral depression being adapted to receive locking means projectable from said locking pin to lock said pin against removal from said bore, whereby said pin is locked to said operator when said locking means projects from said pin and is removable from said operator when said locking means does not project from said pin; and
a cover extending across an end of said skirt and formed with a depending tubular section and having an inwardly extending flange for engagement between a head integral with said locking pin and the end of said operator remote from said valve member when said locking pin is locked against removal from said operator.

* * * * *